(12) United States Patent
Divan et al.

(10) Patent No.: US 9,197,065 B2
(45) Date of Patent: *Nov. 24, 2015

(54) COMPACT DYNAMIC PHASE ANGLE REGULATORS

(71) Applicants: Deepakraj M. Divan, San Jose, CA (US); Anish Prasai, San Jose, CA (US)

(72) Inventors: Deepakraj M. Divan, San Jose, CA (US); Anish Prasai, San Jose, CA (US)

(73) Assignee: VARENTEC, INC., Santa Clara, CA (US)

(*) Notice: Subject to any disclaimer, the term of this patent is extended or adjusted under 35 U.S.C. 154(b) by 489 days.

This patent is subject to a terminal disclaimer.

(21) Appl. No.: 13/707,558

(22) Filed: Dec. 6, 2012

(65) Prior Publication Data

US 2013/0140903 A1 Jun. 6, 2013

Related U.S. Application Data

(60) Provisional application No. 61/611,333, filed on Mar. 15, 2012, provisional application No. 61/567,467, filed on Dec. 6, 2011.

(51) Int. Cl.
*H02J 3/01* (2006.01)
*H02J 3/18* (2006.01)

(52) U.S. Cl.
CPC .............. *H02J 3/01* (2013.01); *H02J 3/1878* (2013.01); *Y02E 40/30* (2013.01); *Y10T 307/707* (2015.04)

(58) Field of Classification Search
CPC ...... H02J 3/01; H02J 3/1878; Y10T 307/707; Y02E 40/30
USPC ........................................ 307/43, 45, 82, 113
See application file for complete search history.

(56) References Cited

U.S. PATENT DOCUMENTS

2010/0201338 A1* 8/2010 Haj-Maharsi ....... H02M 1/4233
                                                                          323/305
2014/0319910 A1* 10/2014 Divan et al. ..................... 307/20

\* cited by examiner

*Primary Examiner* — Thienvu Tran
*Assistant Examiner* — Kevin J Comber
(74) *Attorney, Agent, or Firm* — Sheppard Mullin Richter & Hampton LLP

(57) ABSTRACT

Compact dynamic Phase Angle Regulators (CD-PARs) are provided. A Compact Dynamic Phase Angle Regulator (CD-PAR) is a stand-alone device that regulates phase angle through a single transformer. A CD-PAR has no external energy source, uses low-rating devices, and can be isolated from a fault in the grid. A CD-PAR may be implemented in a single-phase or in a three-phase configuration, but the operation of a CD-PAR cross-couples all three phases. A CD-PAR controls both the real and the reactive power flow between two AC sources having the same frequency by inserting a voltage with controllable magnitude and phase. A CD-PAR may be implemented in either a buck configuration or a boost configuration.

15 Claims, 13 Drawing Sheets

COMPACT DYNAMIC PHASE ANGLE REGULATORS

CROSS-REFERENCE TO RELATED APPLICATIONS

This application claims benefit of U.S. Provisional Patent Application No. 61/567,467, filed on Dec. 6, 2011, entitled "Transmission & Distribution Power Router—CD-PAR", and U.S. Provisional Patent Application No. 61/611,333, filed on Mar. 15, 2012, entitled "Active AC Snubber for Direct AC/AC Power Converters," which is hereby incorporated herein by reference in its entirety.

TECHNICAL FIELD

The present invention(s) relate generally to controlling power flow in an electric power system. More particularly, the invention(s) relate to compact dynamic phase angle regulators in an electric power system.

DESCRIPTION OF THE RELATED ART

An electric power system is a network of interconnected electrical equipments that generate, transmit, and consume electric power. Electric power is delivered to consumers through a transmission network and a distribution network from generators to consumers. The transmission network and the distribution network are often known as the transmission grid and the distribution grid, respectively. Operation of the transmission grid and the distribution grid was once straightforward before the deregulation of the electric power market, but became extremely complex as a result of the competition among various utility companies. Increased amount of electric power is flowing in the electric power system and causing congestion and overflow in certain parts of the electric power system, which may limit the capacity of the electric power system and also impact the reliability of the electric power system. As the electric power system is highly dynamic, real-time power flow control ensures the electric power system's reliability and increases its capacity and efficiency.

Various devices can be installed on the electric power system to perform electric power flow controls such as a Phase Angle Regulator (PAR), also known as a Phase Shifting Transformer (PST), and a Unified Power Flow Controller (UPFC). PARs or PSTs correct the phase angle difference between two parallel connected electrical transmission systems and thereby control the power flow between the two systems so that each can be loaded to its maximum capacity. Conventional PARs and PSTs insert a series voltage to a phase that is in quadrature with the line-to-neutral voltage. However, conventional PARs or PSTs cannot control the reactive power flow independently from the active power flow. Their dynamic capabilities, if they exist, are also very limited.

UPFCs comprise two inverters where the active power can freely flow in either direction between the two inverters and each inverter can independently generate or absorb reactive power. UPFCs typically can insert a desired series voltage, balancing average power flow using the shunt inverter. However, UPFCs are typically used at very high power and voltage levels (100 MW @ 345 KV). The need for the UPFC to survive faults and abnormal events on the grid makes their design complex and expensive. As a result, although UPFC's have been commercially available for decades, few have been deployed.

BRIEF SUMMARY OF EMBODIMENTS OF THE INVENTION

According to various embodiments of the invention, a system of compact dynamic phase angle regulation is provided. In various embodiments, a Compact Dynamic Phase Angle Regulator (CD-PAR) is a stand-alone device that regulates phase angle through a single transformer. A CD-PAR has no external energy source, uses low-rating insulated-gate bipolar transistors (IGBTs), and can be isolated from a fault in the grid. A CD-PAR may be implemented in a single-phase or in a three-phase configuration, but the operation of a CD-PAR cross-couples all three phases. CD-PARs may be installed around a sectionalizer device at a T-junction such that CD-PARs can be deployed into a meshed grid. Further, various embodiments may act autonomously but in a coordinated manner when deployed to a grid. CD-PARs enable power routing along a specific path to the target, which in turn make it feasible to open up new and competitive energy markets.

A CD-PAR controls both the real and the reactive power flow between two AC sources having the same frequency. Various embodiments insert a voltage with controllable magnitude and phase between two AC sources; thereby effecting control of active and reactive power flows between two AC sources. In some embodiments, by controlling the average duty cycle of AC switches in the converter, the effective phase angle between two voltages may be regulated. In further embodiments, by modulating the duty cycle of the voltage converters with an even harmonic, the amplitude of the inserted voltage may be adjusted with respect to the AC source voltages. A CD-PAR may be implemented in either a buck configuration or a boost configuration. Compared with the buck configuration, the boost configuration eliminates the need for an additional filter inductor, which is instead provided by the transformer leakage inductance.

In some embodiments, a CD-PAR comprises a bypass failnormal switch so that both the transformer and AC switches are isolated from fault currents or high transient voltages during any fault, because the fault current is diverted by the bypass switch until line breakers trip. Further, failure of a CD-PAR does not interrupt normal operation of the electric power system. In some embodiments, a CD-PAR may include a fast acting switch which can isolate the two AC sources to prevent fault current contributions from overloading protection relays in the two grid sections. Moreover, in some embodiments, a CD-PAR may comprise an AC snubber that is used to ensure safe operation of the voltage converters. The AC snubber may also be integrated into the gate driver of the switches.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
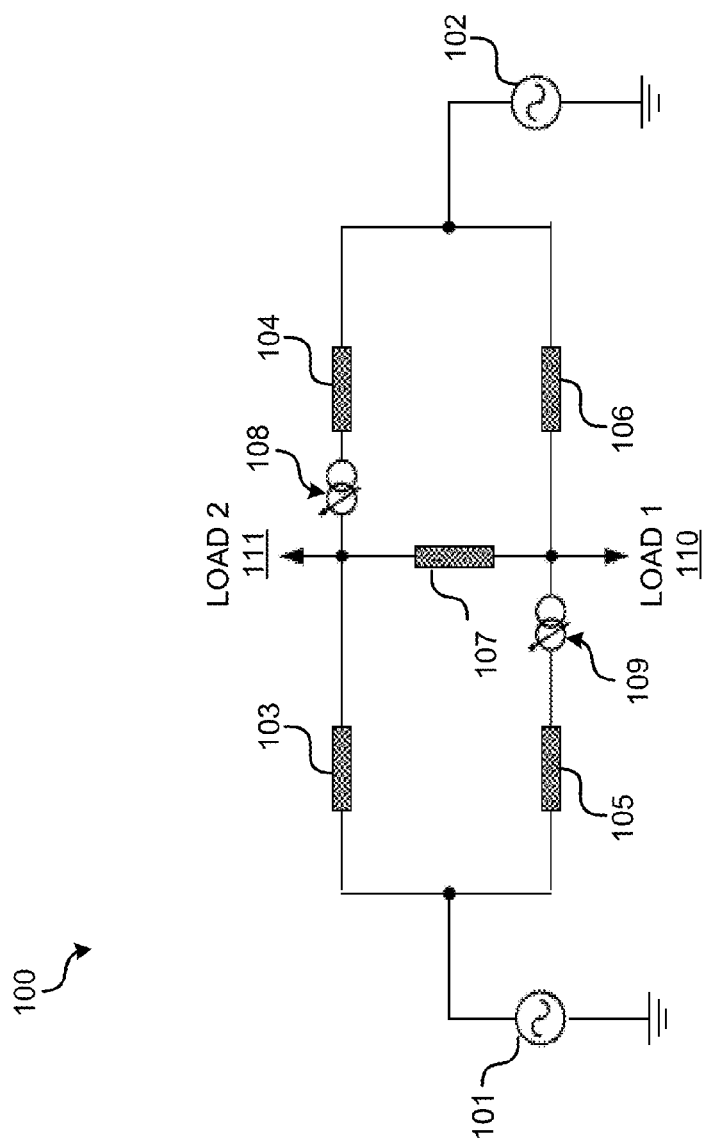
FIG. 1 illustrates an exemplary system diagram of an electric power system where various embodiments of the invention can be implemented.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE
EMBODIMENTS OF THE INVENTION

According to various embodiments of the invention, a system of compact dynamic phase angle regulation is provided. In various embodiments, a Compact Dynamic Phase Angle Regulator (CD-PAR) is a stand-alone device that injects a three-phase voltage between two three-phase AC sources using a single three-phase transformer or three single-phase transformers in combination with a fractionally rated power converter per phase. A CD-PAR has no external energy source, uses low-rating insulated-gate bipolar transistors (IGBTs), and is isolated from a fault in the grid. A CD-PAR may be implemented in a single-phase or in a three-phase configuration, but the operation of a CD-PAR cross-couples all three phases. CD-PARs may be installed around a sectionalizer device at a T-junction such that CD-PARs can be deployed into a meshed grid. CD-PARs may also be used to interconnect radial grids, realizing active and reactive power exchange between two independent distribution feeders. Further, various embodiments may act autonomously but in a coordinated manner when deployed to a grid. CD-PARs provide routing power along a specific path to the target, which in turn makes it feasible to open up new and competitive energy markets.

A CD-PAR controls both the real and the reactive power flow between two AC sources having the same frequency. Various embodiments insert a voltage with controllable magnitude and phase between two AC sources; thereby effecting control of active and reactive power flows between two AC source. In some embodiments, by controlling the average duty cycle of AC switches in the converter, the effective phase angle between two voltages may be regulated. In further embodiments, by modulating the duty cycle of the voltage converters with an even harmonic, the amplitude of the inserted voltage may be adjusted with respect to the AC source voltages. A CD-PAR may be implemented in either a buck configuration or a boost configuration. Compared with the buck configuration, the boost configuration eliminates the need for an additional filter inductor, which is instead provided by the transformer leakage inductance.

In some embodiments, a CD-PAR comprises a bypass fail-normal switch so that both the transformer and AC switches are isolated from fault currents or high transient voltages during any fault, because the fault current is diverted by the bypass switch until line breakers trip. Further, failure of a CD-PAR does not interrupt normal operation of the electric power system. In some embodiments, a CD-PAR may include a fast acting switch, which can isolate the two AC sources to prevent fault current contributions from overloading protection relays in the two grid sections. Moreover, in some embodiments, a CD-PAR may comprise an AC snubber that is used to ensure safe operation of the voltage converters. The AC snubber may also be implemented into the gate driver of the switches.

Before describing the invention in detail, it is useful to describe a few example environments with which the invention can be implemented. One such example is that of illustrated in FIG. 1.

FIG. 1 illustrates an exemplary system diagram of an electric power system 100 where various embodiments of the invention can be implemented. The electric power system 100 comprises generators 101 and 102; loads 110 and 111; and transmission lines 103-107, which may have different ratings and are loaded differently. Various CD-PARs may be deployed to the power system 100, especially around existing sectionalizers, reclosers or breaker devices in any transmission line where a T-junction is located. In the illustrated example, two CD-PARs 108 and 109 are installed. As a result of this installation, power flows of the power system 100 may be controlled. In other words, both the active and reactive power along each transmission line of the power system 100 may be redirected.

From time-to-time, the present invention is described herein in terms of this example environment. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figures 2A, 2B:
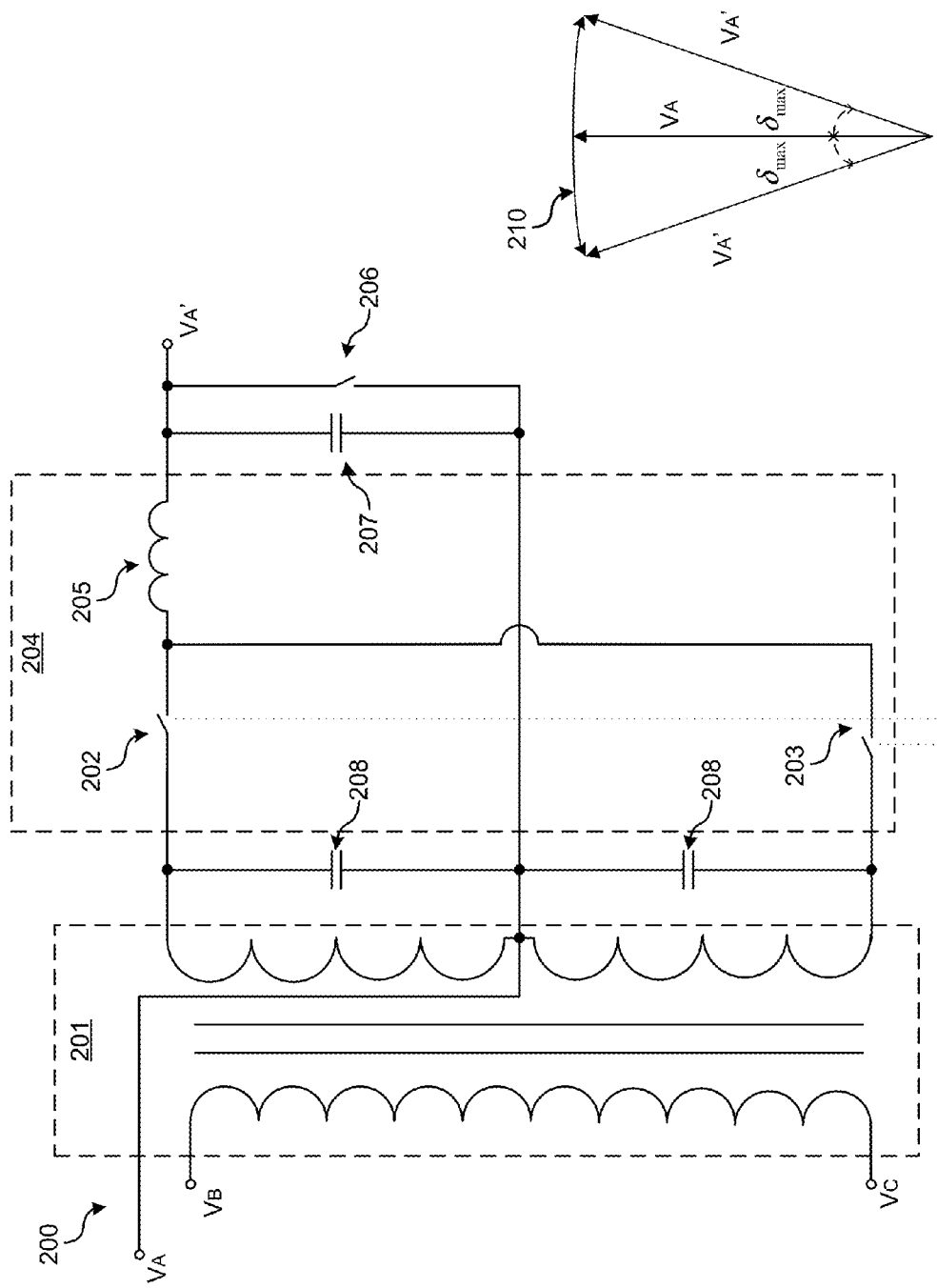
FIG. 2A illustrates an exemplary schematic diagram of a single-phase compact dynamic phase-angle regulator (CD-PAR) with a buck configuration in accordance with an embodiment of the invention.
FIG. 2B is a vector diagram depicting the range of phase shifts provided by a compact dynamic phase-angle regulator in accordance with an embodiment of the invention.

FIG. 2A illustrates an exemplary schematic diagram of a single-phase compact dynamic phase-angle regulator (CD-PAR) 200 with a buck configuration in accordance with an embodiment of the invention described herein. The CD-PAR 200 comprises a transformer 201 with a single-set of secondary windings, multiple AC switches 202, 203, a bypass switch 206, filter capacitors 208 and 207, a filter inductor 205 and a control module 209. AC switches 202 and 203 and filter inductor 205 are so connected as an AC/AC buck converter 204. The control module 209 regulates the switches 202 and 203, in other words, the duty cycle D of the buck converter 204. In the illustrated example, the primary winding of the transformer 201 is coupled to a line-line voltage $V_{BC}$. The center point of the secondary winding of the transformer 201 is inserted in an AC line (e.g., phase A), and thus is coupled to a line-neutral voltage $V_A$.

Line-line voltage $V_{BC}$ is in quadrature, at a phase angle of 90°, with respect to the line-neutral voltage $V_A$. By regulating the AC switches 202 and 203 or the duty cycle D of the buck converter 204, a voltage that is proportionate to the line-line voltage $V_{BC}$ is added to or subtracted from the line-neutral voltage $V_A$, thereby the CD-PAR output voltage $V_A'$ is phase-shifted with respect to $V_A$. During a period, when the AC switch 202 is constantly on and the AC switch 203 is constantly off, the voltage $V_A'$ is phase shifted to lead the voltage $V_A$ by a maximum phase-shift angle $\delta_{max}$, but has essentially the same amplitude as $V_A$. During a period, when the AC switch 203 is constantly on and the AC switch 202 is constantly off, the voltage $V_A'$ is phase shifted to lag the voltage $V_A$ by a maximum phase-shift angle $\delta_{max}$, but has essentially the same amplitude as $V_A$. During a period, when the AC switch 202 is on and the AC switch 203 is off for half of the period while the AC switch 202 is off and the AC switch 202 is on for the other half of the period, the output voltage $V_A'$ equals to the input voltage $V_A$.

FIG. 2B is a vector diagram depicting the range of phase shifts provided by a compact dynamic phase-angle regulator in accordance with an embodiment of the invention. As illustrated in FIG. 2B, vector 210 is the inserted voltage that is proportionate to the line-line voltage $V_{BC}$. Because the inserted voltage, vector 210, is in quadrature with respect to $V_A$, phase-shift angle $\delta$ between voltages $V_A$ and $V_A'$ may be regulated through changing the amplitude of the inserted voltage, vector 210. By controlling the duty cycle D of the buck converter 204 to a constant that is in a range of [0, 1], voltage $V_A'$ may be phase shifted with respect to voltage $V_A$ between $[-\delta_{max}, \delta_{max}]$, where a negative phase-shift angle $\delta$ denotes that $V_A'$ lags $V_A$ and a positive phase-shift angle $\delta$ denotes that $V_A'$ leads $V_A$. As such, control of active power is also achieved as the active power transferred over a transmission line $$(P = \frac{V_A V_A'}{X} \sin\delta,$$

where X is the line impedance) is a function of $\delta$.

Further, the amplitude of $V_A'$ may also be regulated by modulating the duty cycle D of the buck converter 204. In one embodiment, the control module 209 may implement the Virtual Quadrature Sources (VQS) (described in the U.S. Pat. No. 8,179,702, entitled "Voltage Synthesis Using Virtual Quadrature Sources") as the modulation strategy. In one embodiment, the switch duty is modulated with a constant plus a second harmonic. The control module 209 may modulate the AC switches 202 and 203 with an even harmonic such that a direct voltage that is in phase with the line-to-neutral voltage $V_A$, is added to or subtracted from $V_A$, thereby regulating the amplitude of $V_A'$ with respect to the voltage $V_A$. In turn, control of reactive power flow is also achieved as a function of the voltage amplitude $V_A$ and $V_A'$, described as the reactive power flow between two buses as $$Q = \frac{V_A V_A'}{X}\left(\cos\delta - \frac{V_A'}{V_A}\right),$$

where X is the line impedance. In one embodiment, the control module 209 uses the second harmonic, and the subsequent voltage $V_A'$ expression is as given in Equation (1)

$$V_A' = nV_{BC}(2D-1) + V_A = V_m(\sin(\overline{\omega}t)) + \sqrt{3}\, n(2K_0-1)\sin(\overline{\omega}t-90°) - nK_2\sqrt{3}\sin(\overline{\omega}t+\phi_2)) - nK_2V_m\sqrt{3}\sin(3\overline{\omega}t+\phi_2) \quad (1)$$

where, n=transformer turns ratio, $V_A = V_m(\sin(\overline{\omega}t))$, $V_{BC} = \sqrt{3}V_m \sin(\overline{\omega}t-90°)$, $D = K_0 + K_2 \sin(2\overline{\omega}t+\phi_2)$ Triplen harmonic may result in $V_A'$ as a result of modulating the duty cycle D of the buck converter 204 with an even harmonic for reactive power flow control. In one embodiment, a second harmonic is injected to modulate the duty cycle D resulting in a third harmonic voltage. As shown in equation (1), $V_A'$ comprises two components: (1) a fundamental component $V_m(\sin(\overline{\omega}t)) + \sqrt{3}\, n(2K_0-1)\sin(\overline{\omega}t-90°) - nK_2\sqrt{3}\sin(\overline{\omega}t+\phi_2))$, and (2) a third harmonic $-nK_2\sqrt{3}\sin(\overline{\omega}t+\phi_2)$. As the third harmonic is a zero sequence component, the third harmonic may circulate in a transformer if the transformer's windings are delta connected. Various embodiments may comprise a third harmonic filter remove the undesirable third harmonic voltage. Schematic of one filter according to an embodiment is shown in FIG. 7A. In various embodiments, the level of third harmonic induced from reactive power flow control is minimized. Accordingly, the primary control objective to control the active power flow is realized.

With further reference of FIG. 2A, the AC switch 206 is a bypass switch. In one embodiment, a thyristor-pair switch may be used. In further embodiments, electromechanical or vacuum switches may be used in parallel with a thyristor-pair as the fail-normal switch 206 to provide fast response. With the bypass switch 206, various embodiments are capable of maintaining uninterrupted grid operations when the CD-PAR unit fails (fail normal) or when it is bypassed, sustaining the transient voltages seen on a typical grid, and sustaining fault-currents in coordination with existing protective gear installed on the transmission line. The bypass switch 206 triggers if the AC switches 202 and 203, and transformer 201 were to ever fail and thus provides a fail-normal function. Accordingly, the grid operation will remain uninterrupted even when a CD-PAR unit is lost. Further, the bypass switch 206 turns on and carries the fault current for several line cycles upon sensing a fault current until an in-line breaker trips. The transformer windings thus do not carry fault currents or are subject to high transient voltages during fault mode. In one embodiment, thyristor devices rated at 3500 A and 8 kV are used.

Figure 9:
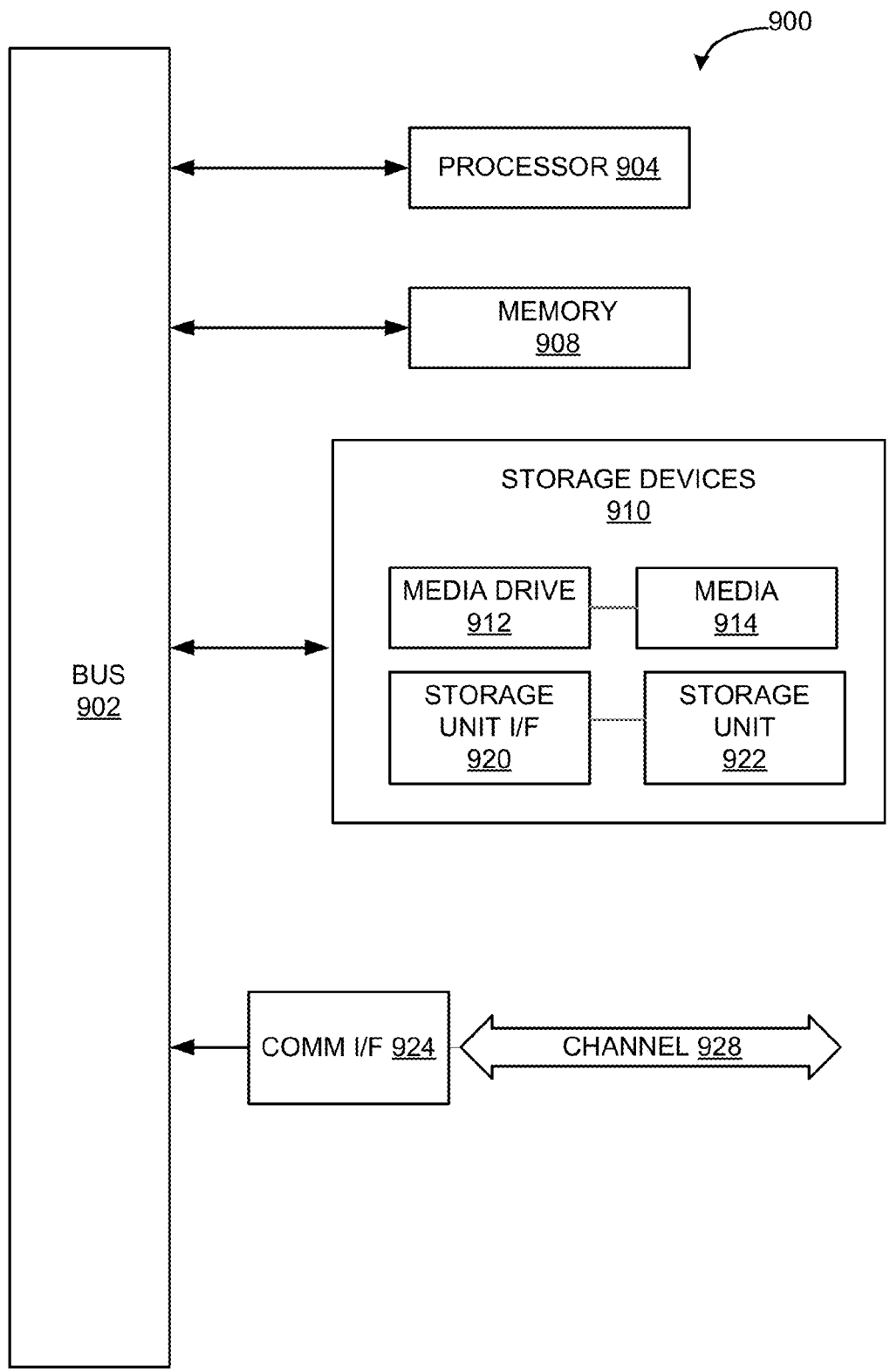
FIG. 9 illustrates an example computing module that may be used in implementing various features of embodiments of the invention.

In various embodiments, each of the AC switches 202 and 203 is a pair of IGBTs that are either common-emitter and/or common-collector connected. In one embodiment, the buck converter 204 and the transformer 201 may be both cooled by the transformer oil and a passive cooling system. In various embodiments, the electronics of CD-PAR are housed in a separate housing from the transformer housing. In further embodiments, the control module 209 may be implemented by an example computing module as illustrated in FIG. 9. In various embodiments, the control module 209 may communicate with a grid control center.

Figure 2C:
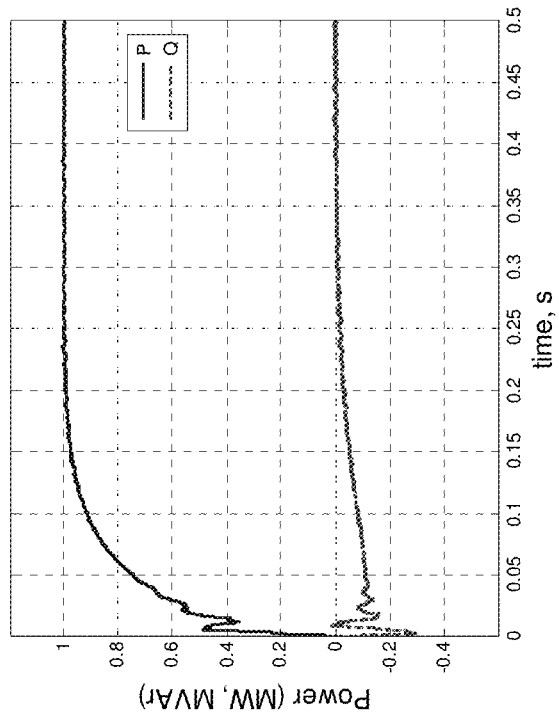
FIG. 2C is a diagram depicting a control range of active power P and reactive power Q of an embodiment of the invention.

FIGS. 2C is a diagram depicting a control range of active power P and reactive power Q of an embodiment of the invention described herein. As illustrated, with a constant duty cycle, control over mostly the active power is achieved. Control over the reactive power is accomplished by regulating the duty cycle according to the VQS technique.

Figure 2D:
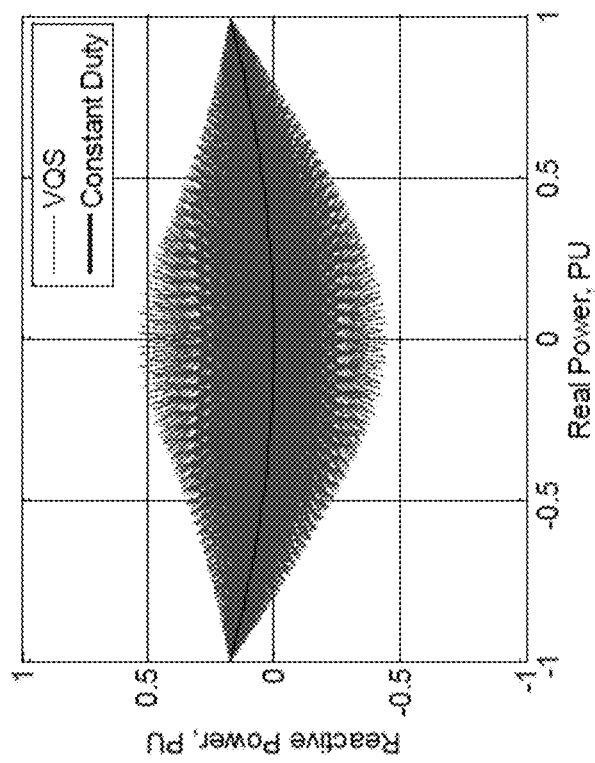
FIG. 2D is a simulation waveform depicting control of active power P and reactive power P of a CD-PAR in accordance with an embodiment of the invention.

FIG. 2D is a simulation waveform depicting control of active power P and reactive power P of a an embodiment of the invention described herein.

Figure 2E:
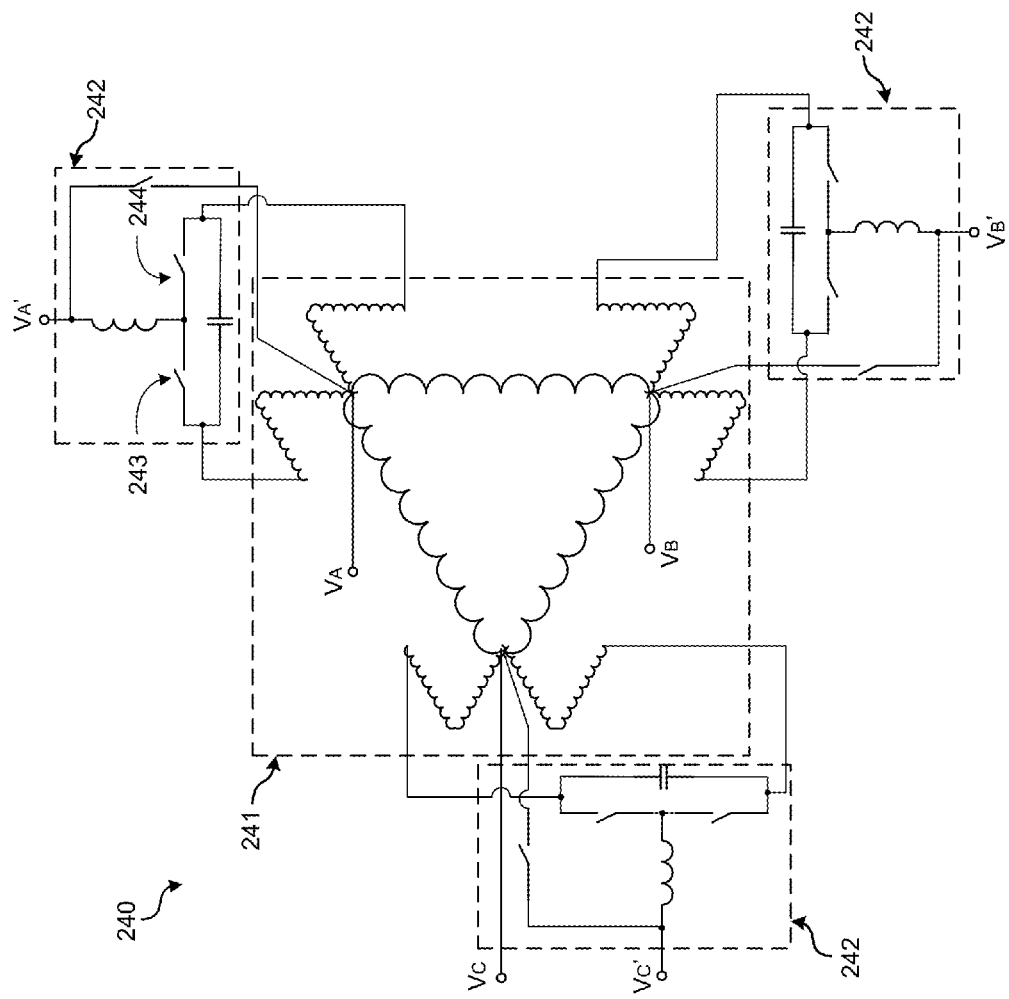
FIG. 2E illustrates an exemplary schematic diagram of a three-phase CD-PAR with a buck configuration in accordance with an embodiment of the invention.

FIG. 2E illustrates an exemplary schematic diagram of a three-phase CD-PAR 240 with a buck configuration in accordance with an embodiment of the invention described herein. In the illustrated example embodiment, the three-phase CD-PAR 240 comprises a three-phase transformer 241, of which the primary winding is configured in the delta configuration, and a set of secondary windings are connected as shown. Take phase A for example, the input line-neutral voltage $V_A$ is electrically coupled to the center point of a secondary winding. In one embodiment, the secondary windings may be magnetically coupled to the line-line voltage $V_{BC}$. In further embodiments, the secondary windings may be magnetically coupled to the line-line voltages $V_{AB}$ and $V_{AC}$. In one embodiment, the three-phase transformer 241 is an autotransformer. The AC switches 243 and 244 of the buck converter 242 are operated similarly to the single-phase CD-PAR 200 illustrated in FIG. 1A with a fixed switching frequency $f_s$ and a duty cycle D as defined in Equation (1). In one embodiment, the CD-PAR 240 may be implemented in one integrated package.

Figures 3A, 3B:
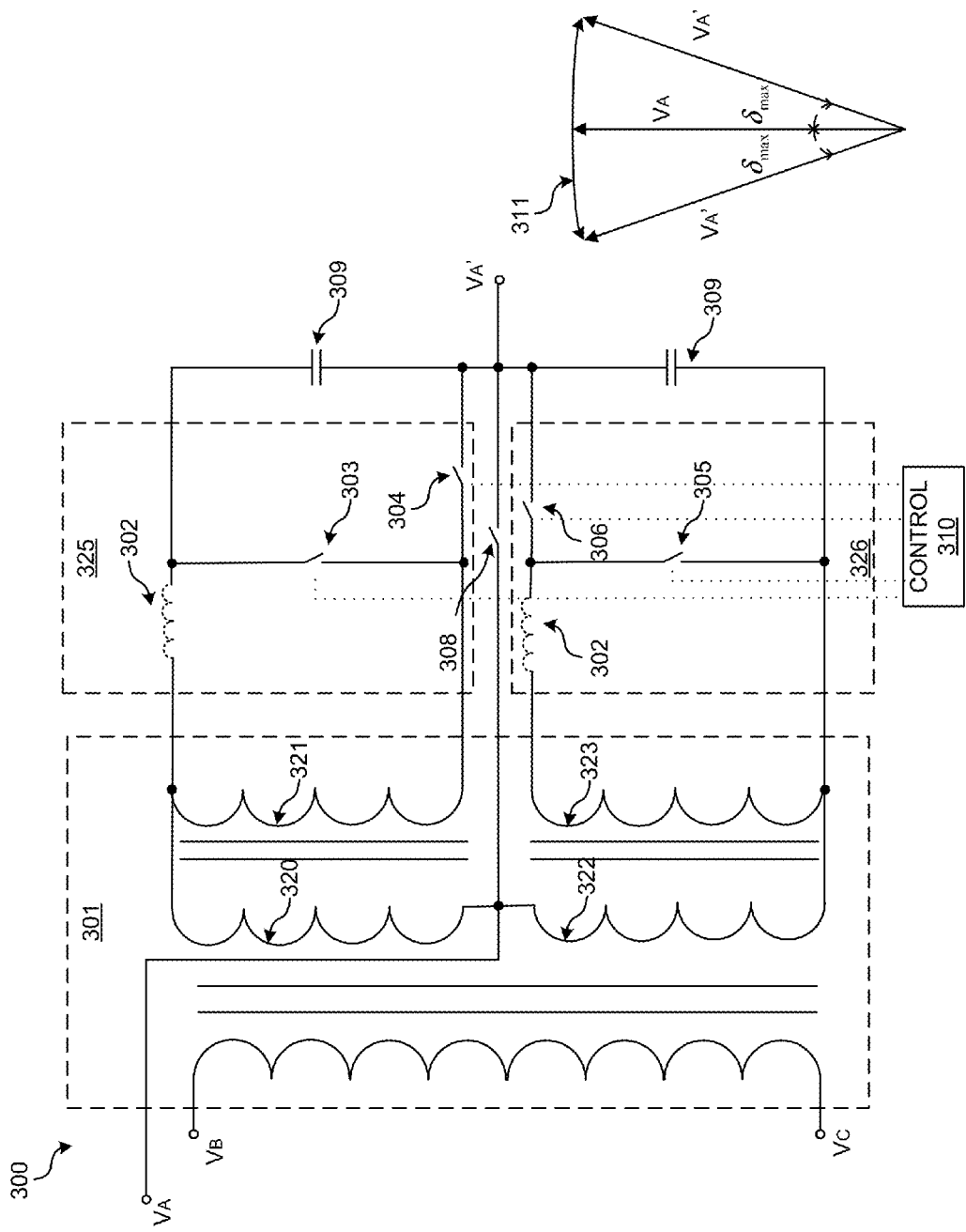
FIG. 3A illustrates an exemplary schematic diagram of a single-phase CD-PAR with a boost configuration in accordance with an embodiment of the invention.
FIG. 3B is a vector diagram depicting the range of phase shifts provided by a compact dynamic phase-angle regulator in accordance with an embodiment of the invention.
Figure 3C:
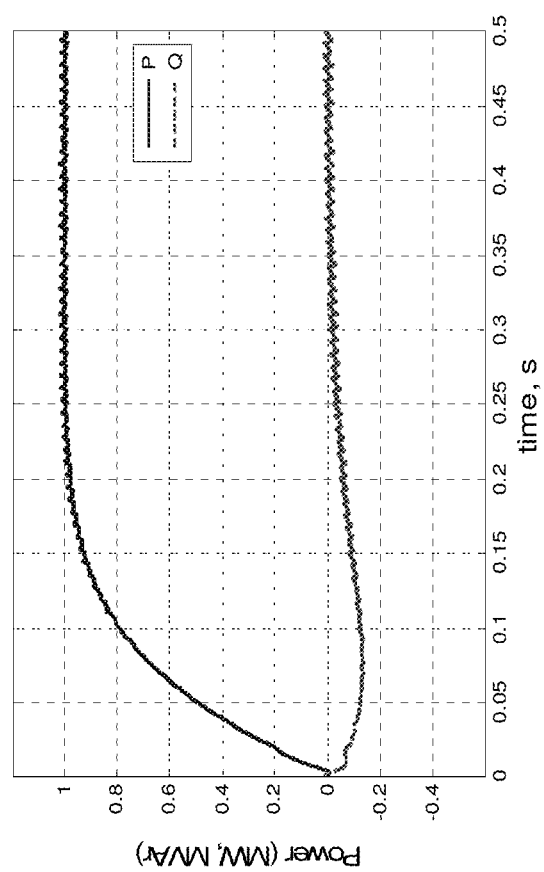
FIG. 3C is a simulation diagram depicting control of active power P and reactive power Q of a CD-PAR in accordance with an embodiment of the invention.

FIG. 3A illustrates an exemplary schematic diagram of a single-phase CD-PAR 300 with a boost configuration in accordance with an embodiment of the invention described herein. The CD-PAR 300 comprises a transformer 301 with a single-set of secondary windings 320-323, a boost inverter 325 comprising AC switches 303 and 304 and a boost inverter 326 comprising AC switches 305 and 306, a bypass switch 308, and a filter capacitors 309. The inductance 302 represents equivalence of the leakage inductance of the transformer 301 serving as the boost inductor of each of the boost converters 305 and 306 thereby eliminating additional inductors. The control module 310 regulates the duty cycle D of the boost converters 325 and 326, that is, the switches 303, 304, 305, and 306. The illustrated example CD-PAR 300 comprises two boost AC/AC converters, with switches 303 and 304 operating as a first complementary pair and 305 and 306 operating as a second complementary pair. The switch pair 303 and 304 operates when power is flowing in one direction, whereas the switch pair 305 and 306 operates when reversing the power flow.

In the illustrated example, the primary winding of the transformer 301 is electrically coupled to a line-to-line voltage $V_{BC}$. The center point of the secondary winding of the transformer 301 is inserted in an AC line (e.g., phase A), and thus is coupled to a line-to-neutral voltage $V_A$. The line-to-line voltage $V_{BC}$ is in quadrature, at a phase angle of 90°, with respect to the line-to-neutral voltage $V_A$. Through regulating the duty cycle D of each of the boost converters 325 and 326, a voltage that is in-phase with the line-line voltage $V_{BC}$, is added to or subtracted from the line-to-neutral voltage $V_A$. During a period, when one of the AC switches 303 and 304 is constantly on and the AC switches 305 and 306 are constantly off, the voltage $V_A'$ is phase shifted to lead the voltage $V_A$ by a phase-shift angle δ, but has essentially the same amplitude as $V_A$. During a period, when one of the AC switches 305 and 306 is constantly on and the AC switches 303 and 304 are constantly off, the voltage $V_A'$ is phase shifted to lag the voltage $V_A$ by a phase-shift angle δ, but has essentially the same amplitude as $V_A$. During a period, when the AC switches 303 and 304 are switched with a duty cycle of 0.5 and the AC switches 305 and 306 are off, a maximum shift $δ_{max}$ may be realized. Similarly, when the AC switches 303 and 304 are off and the AC switches 305 and 306 are switched with a duty cycle of 0.5, a maximum lagging phase shift $δ_{max}$ may be realized. During a period, when the converter is operated with the AC switch 304 or 306 on, the output voltage $V_A'$ equals $V_A$.

FIG. 3B is a vector diagram depicting the range of phase shifts provided by a compact dynamic phase-angle regulator in accordance with an embodiment of the invention. As illustrated in FIG. 3B, the vector 311 is the inserted voltage that is in-phase to the line-to-line voltage $V_{BC}$. Because the inserted voltage, vector 311, is in quadrature with respect to $V_A$, the phase-shift angle δ between voltages $V_A$ and $V_A'$ may be regulated through changing the amplitude of the inserted voltage, that is the vector 310. By controlling the duty cycle D of each of the boost converters 325 and 326 to a constant that is in a range of [0, 0.5], voltage $V_A'$ may be phase shifted with respect to voltage $V_A$ between $[-δ_{max}, δ_{max}]$, where a negative phase-shift angle δ denotes that $V_A'$ lags $V_A$ and a positive phase-shift angle δ denotes that $V_A'$ leads $V_A$. As such, control of active power is achieved as the active power transferred over a transmission line $$(P = \frac{V_A V_A'}{X} \sin δ,$$

where X is the line impedance) is a function of δ.

Further, the amplitude of $V_A'$ may also be regulated by modulating the duty cycle D of each of the boost converters 325 and 326. The VQS control technique may also be employed to regulate AC switches 303, 304, 305, and 306. The switches may be modulated with an even harmonic so that a direct voltage, which is in phase with voltage $V_A$ and may be added to or subtracted from $V_A$, thereby regulating the amplitude of $V_A'$ with respect to voltage $V_A$. In turn, control of reactive power flow is also achieved. In one embodiment, a second harmonic is used to modulate the duty cycle of the boost converter employed in the CD-PAR, and the subsequent voltage $V_A'$ expression is as given in Equation (2)

$$V_A' = V_A \pm \frac{nD}{1-D} V_{BC} \quad (2)$$

Where, n=transformer turns ratio, $V_A = V_m(\sin(\overline{\omega}t))$, $V_{BC} = \sqrt{3} V_m \sin(\overline{\omega}t - 90°)$, $D = K_0 + K_2 \sin(2\overline{\omega}t + \phi_2)$ With further reference to FIG. 3A, in one embodiment, a CD-PAR with boost configuration may be implemented in a three-phase setting using a three-phase autotransformer, where the primary winding is configured as a delta winding similar to the three-phase implementation of the CD-PAR with a buck configuration as illustrated in FIG. 2E. In one embodiment, the AC switches and capacitors are mounted on a common heatsink with electrical interconnections realized using a bus plane, with the heat exchanger surface immersed in the oil flow path.

With further reference of FIG. 3A, the AC switch 308 is a bypass switch. In one embodiment, a thyristor-pair switch may be used. In further embodiments, electromechanical or vacuum switches may be used in parallel with a thyristor-pair as the fail-normal switch 308 to provide fast response. With the bypass switch 308, various embodiments are capable of maintaining uninterrupted grid operations when the CD-PAR unit fails (fail normal) or when it is bypassed, sustaining the transient voltages seen on a typical grid, and sustaining fault-currents in coordination with existing protective gear installed on the transmission line. The bypass switch 308 triggers if the AC switches 303-306, and transformer 301 were to ever fail and thus provides a fail-normal function. Accordingly, the grid operation will remain uninterrupted even when a CD-PAR unit is lost. Further, the bypass switch 308 turns on and carries the fault current for several line cycles upon sensing a fault current until an in-line breaker trips. The transformer windings thus do not carry fault currents or are subject to high transient voltages during fault mode. In one embodiment, thyristor devices rated at 3500 A and 8 kV are used.

In various embodiments, each of the AC switches 303-306 is a pair of IGBTs that are either common-emitter and/or common-collector connected. In one embodiment, the boost converters 325 and 326 together with the transformer 301 may be both cooled by the transformer oil and a passive cooling system. In various embodiments, the electronics of CD-PAR are housed in a separate housing from the transformer housing. In further embodiments, the control module 310 may be implemented by an example computing module as illustrated in FIG. 9. In various embodiments, the control module 310 may communicate with a grid control center.

Figure 4:
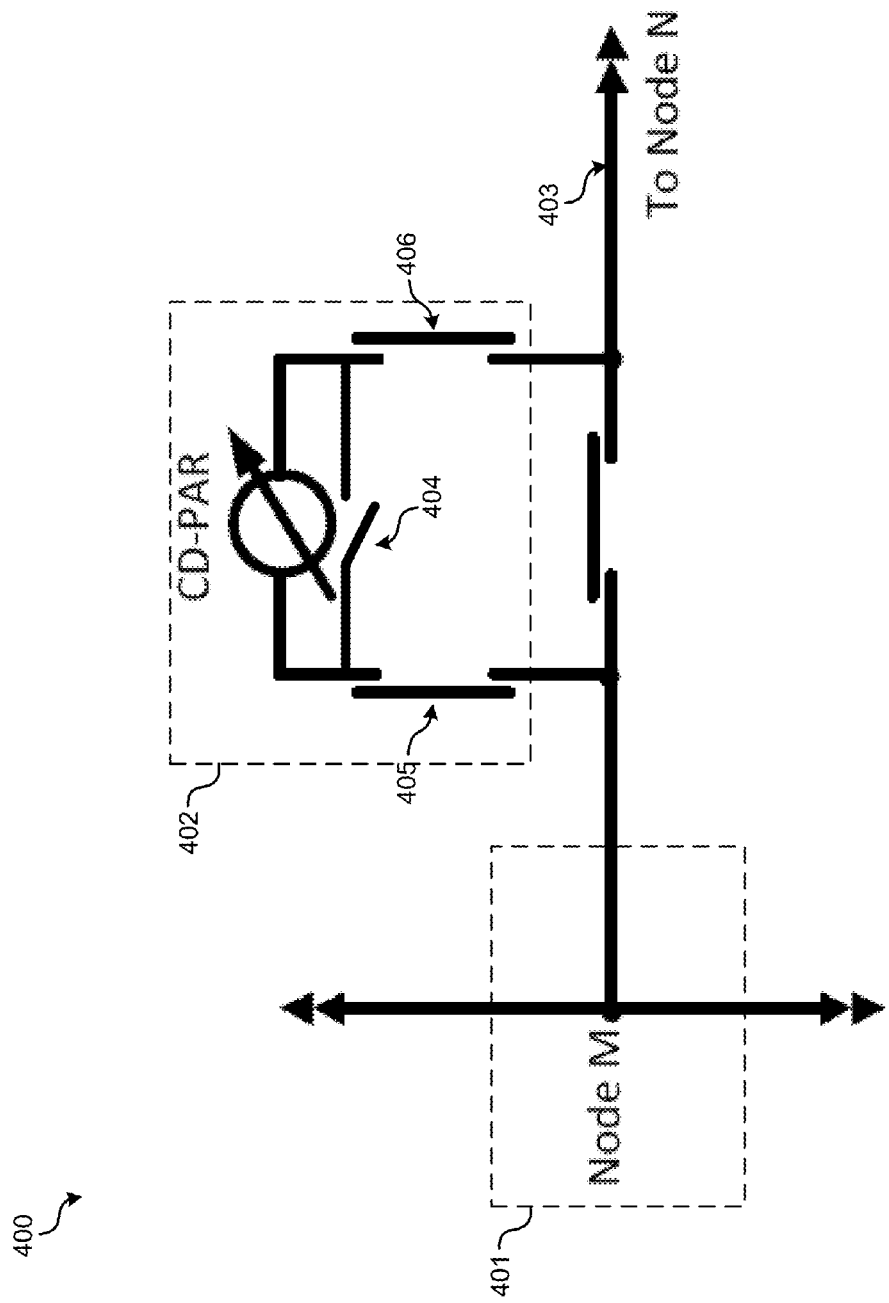
FIG. 4 is a diagram illustrating an installation of a CD-PAR in accordance with an embodiment of the invention.

FIG. 4 is a diagram illustrating an installation of a CD-PAR in accordance with an embodiment of the invention described herein. Various embodiments of the invention may be inserted into any T-junction where a transmission line is tapped. The illustrated CD-PAR comprises a bypass switch 404 and two series switches 405 and 406. In the illustrated example, a CD-PAR 402 is implemented at a T-junction 401 on the transmission line 403, thereby to control active and reactive power flow on the transmission line 403 between nodes M and N. Line interconnections such as 401 are ubiquitous and are the basis of a meshed AC network; therefore, various embodiments can be integrated into a meshed AC network. Further, T-junction 401 features a sectionalizing device, such as a recloser, breaker, or sectionalizer, where the CD-PAR 402 may wrap around the sectionalizing device, performing power flow control during normal operation, and reverting back to fail-normal sectionalizer operation when the embodiment 402 is non-operational. Such implementation will allow uninterrupted operation of the transmission line 403. Further embodiments may be integrated in with the AC line even at locations where a Load Tap Changer (LTC) is not available.

When the embodiment 402 fails (fail normal), the bypass switch 404 provides a fail-normal function and triggers if the AC switches or the transformer of the CD-PAR were to ever fail. As a result, if the CD-PAR 402 is lost, transmission line 403 and the grid may revert to its normal operations. Further, CD-PAR 402 may be completely disconnected from the line 403 to allow servicing and repair without comprising the line reliability by opening the switches 405 and 406.

In some embodiments, the switches 405 and 406 may be Fast Circuit Breakers (FCB). When the protection relays and breakers are not sized to handle fault current contributions that flow through CD-PAR 402, the switches 405 and 406 open to disconnect the CD-PAR 402 from the fault. In such cases, the by-pass switch 404 remains open to isolate the grids, to which the transmission line 403 is connected.

Figure 5:
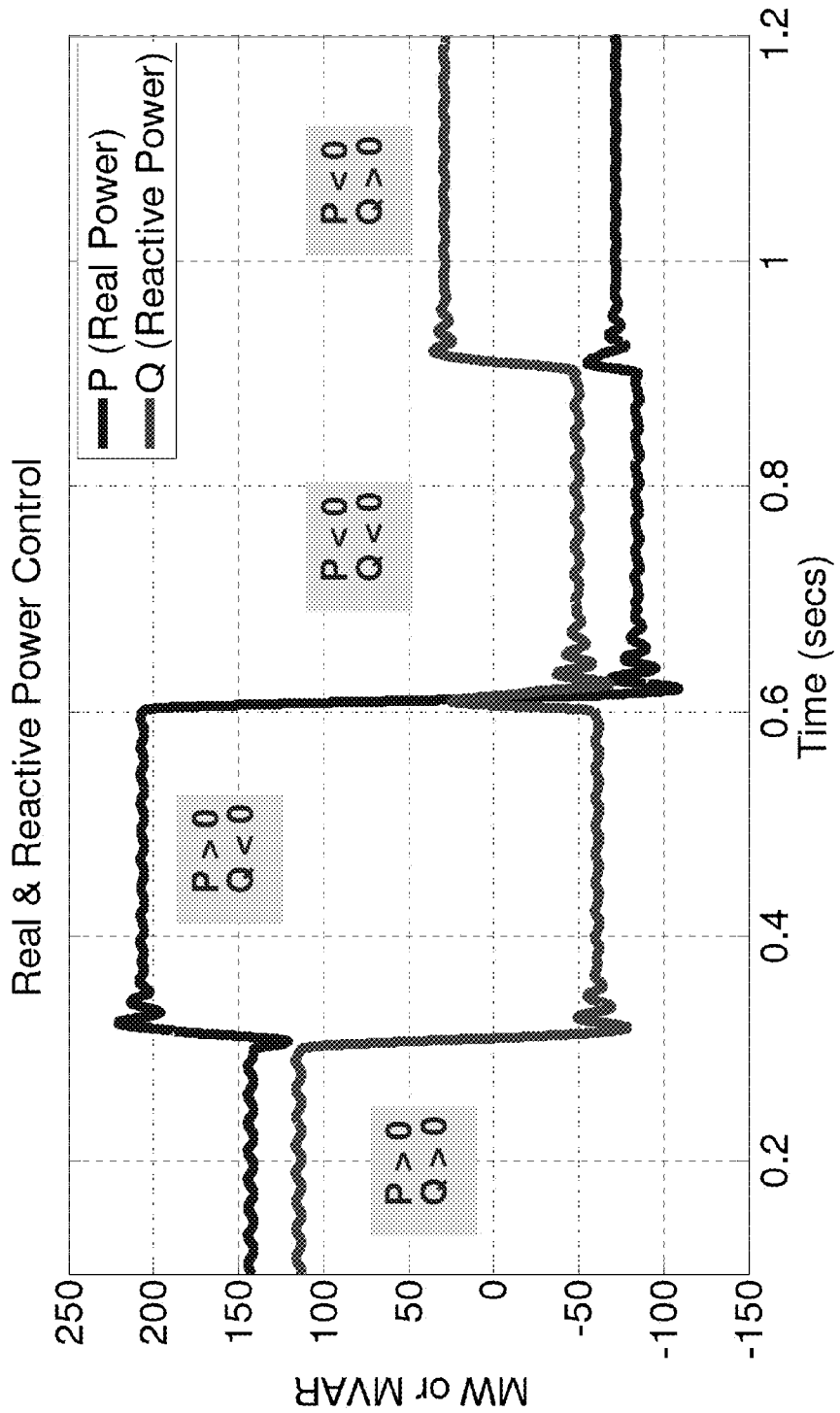
FIG. 5 is a simulation output waveform illustrating the dynamic control capability of a CD-PAR in accordance with an embodiment of the invention.

FIG. 5 is a simulation output waveform illustrating the dynamic control capability of a CD-PAR in accordance with an embodiment of the invention described herein. The simulated system comprises two infinite buses, connected by a fifteen (15) mile tie-line, with one embodiment CD-PAR inserted in a line. For the CD-PAR operating at 139 kV, obtaining a +/−3.50° control range for phase angle can provide +/−200 MW of power flow control for a line of 15 miles in length connecting two strong systems. Nevertheless, the CD-PAR only requires AC switches capable of withstanding 7 kV peak voltage stress and 1200 A peak current, which is a small fraction of the total power controlled. Thus, the transformer in the CD-PAR would have a size and cost equivalent to 12% of the 200 MW in power flow control realized. Based on a transformer cost of USD $25/kVA and switch/converter cost of USD $25/kVA, the final cost of such embodiment is under USD $10/kW of power flow controlled.

Figures 6A, 6B:
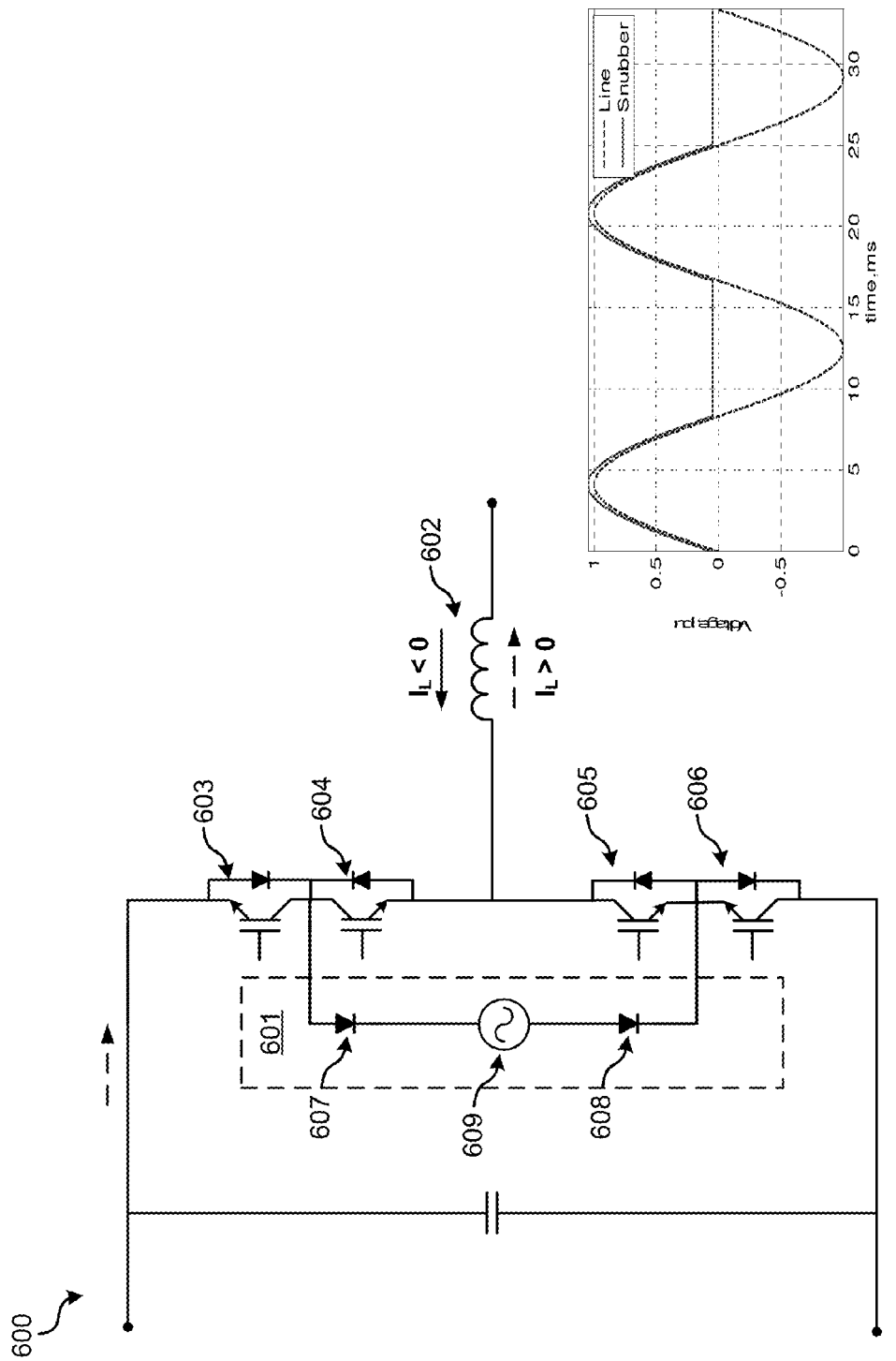
FIG. 6A illustrates an exemplary schematic diagram of an active AC snubber circuit implemented with a buck converter in accordance with an embodiment of the invention.
FIG. 6B depicts a simulation waveform of the snubber voltage in accordance with an embodiment of the invention.

FIG. 6A illustrates an exemplary schematic diagram 600 of an active AC snubber circuit implemented with a buck converter in accordance with an embodiment of the invention described herein. Various embodiments comprise an active AC snubber circuit to ensure a safe operation of the direct AC/AC converters. As errors in measurements invariably exist that may lead to incorrect switch patterns causing large voltage spikes when a current path suddenly become open or cause a large, and potentially detrimental, shoot-through when a capacitor is shorted. Further, in addition to use of a bypass switch, under a major fault, the AC switches must be turned off under local gate drive control to ensure protection. The active snubber circuit provides a free-wheeling path for direct AC/AC converters and ensures that that the converter is tolerant of both errors in measurement and timings and of faults. Moreover, the active snubber circuit may eliminate the zero crossing problems in AC/AC converters with AC switches controlled by sequenced communication strategies. In one embodiment, the active snubber circuit is implemented into the gate drivers of the switches.

In the illustrated example, one embodiment of the AC snubber 601 is implemented with a single-phase AC buck converter comprising two AC (bi-directional) switches in common-collector and common-emitter configurations. The current paths through the snubber 601 have two directions: 1) forward direction where the current through the inductor 602 is positive; and 2) reverse direction where the current through the inductor 602 is negative. When the current path is interrupted, and the inductor current is positive, the "free-wheeling" path is provided by the diode of switch 603 and the diode 607, through the actively regulated snubber voltage 609, diode 608 and the diode of switch 605. When the inductor current is negative, the "free-wheeling" path is provided by the diode of switch 604 and the diode 607, through the actively regulated snubber voltage 609, diode 608 and the diode of switch 606.

Further, the voltage spike on the output due to snubber operation may be eliminated by regulating the snubber voltage 609 appropriately, thus improving the total harmonic distortion (THD) of the buck converter ensuring that volt-second balance across the output filter is well maintained. In one embodiment, as illustrated in FIG. 6B, the regulated voltage 609 is a half-wave rectified line voltage that is maintained slightly higher than the line voltage in order to reverse bias the diodes 607 and 608 such that the AC snubber circuit does not compete with a transmission line in regulating the snubber voltage. Since the AC snubber 601 is maintaining essentially the same voltage as the line voltage during positive half-cycle and zero voltage during negative half-cycle, a voltage equal to the line voltage or zero is applied across the output, replicating the output as if the converter were operating correctly and the AC snubber 601 was not in operation.

With further reference to FIG. 6A, in one embodiment CD-PAR where an active AC snubber is integrated, even with utilization of sensors of low quality and with various delays/errors in the controller, safe commutation of the devices are ensured. Additionally, fault tolerance where should the devices be suddenly turned off due to a fault within or external to the converter, the energy in the filters and parasitics of the converter may be safely sunk into the snubber to be stored for future use or dissipated appropriately, without causing catastrophic failure of the main devices. Also, equal voltage sharing may be ensured among the series-connected devices. In various embodiments, the active AC snubber may be implemented based on a DC/DC converter topology where the converter wave-shapes the half-wave rectified voltage across the main snubber capacitor, while the DC capacitors provide energy storage to wave-shape. The converter may be a simple buck-boost topology, or isolated with flyback-type topology.

FIG. 6B depicts a simulation waveform of the snubber voltage in accordance with an embodiment of the invention.

Figure 6D:
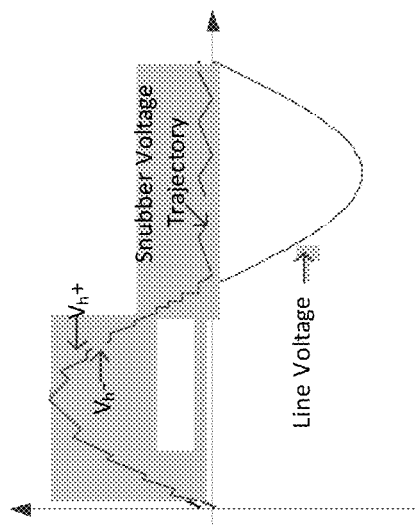
FIG. 6D depicts an exemplary waveform based on hysteresis-based control of the snubber capacitor voltage in accordance with an embodiment of the invention.
Figure 6C:
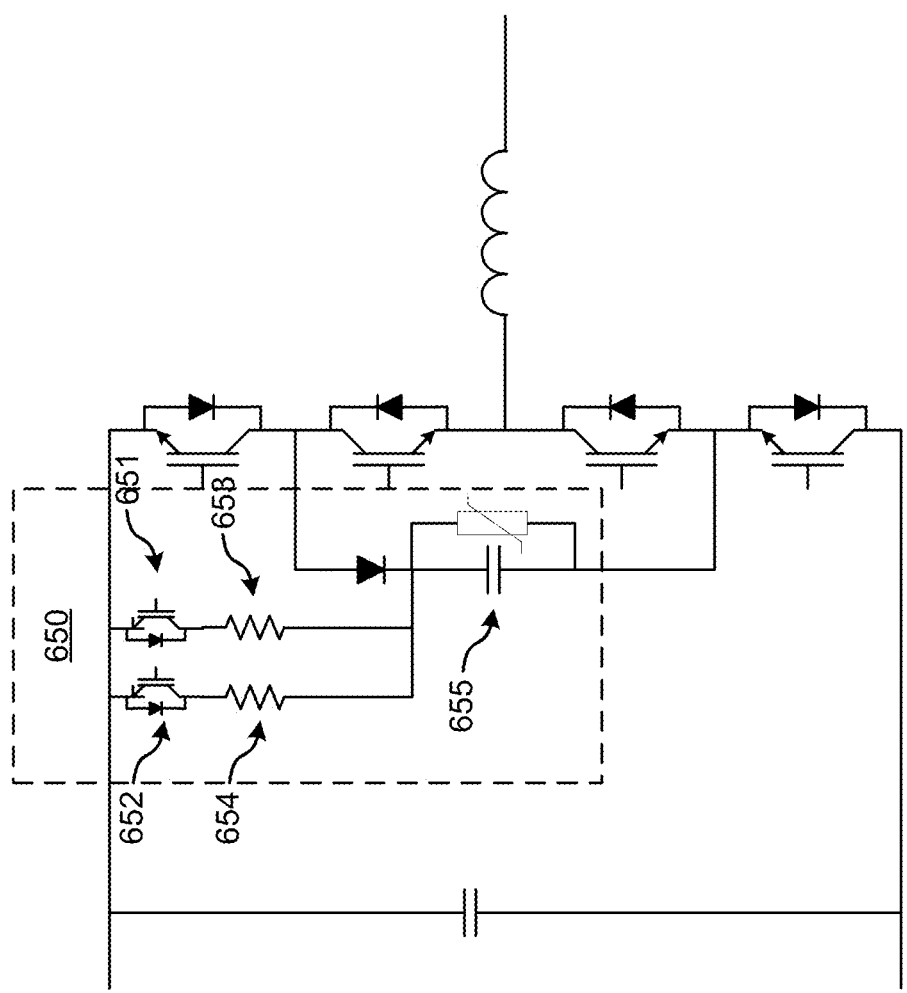
FIG. 6C is an exemplary circuit diagram of a quasi-active AC snubber implemented with a buck converter in accordance with an embodiment of the invention.

FIG. 6C is an exemplary circuit diagram of a quasi-active AC snubber 650 implemented with a buck converter in accordance with an embodiment of the invention described herein. The snubber capacitor 655 is used to synthesize the AC source 609 as illustrated in FIG. 6A. Switch 651 and resistor 653 are used to discharge the snubber capacitor 655 during positive half-wave of the line voltage, and switch 652 and resistor 654 are used to discharge the snubber capacitor 655 during negative half-wave of the line voltage. Resistor 653 may be different from the resistor 654 because the voltage across a resistor during positive half-wave is a small fraction of the line voltage, while the voltage during negative half-wave is full peak of the line voltage.

FIG. 6D depicts an exemplary waveform based on hysteresis-based control of the snubber capacitor voltage in accordance with an embodiment. The implementation of the AC snubber is based on a discrete analog design that operates entirely separate from the main controller of the converter. The control is based on hysteresis control where the voltage across the snubber capacitor 655 is regulated within two bands through control of the switches 651 and 652. Referring to FIG. 6D, to optimize performance and minimize losses, resistor 654 is selected to be a large resistor. In one embodiment, the size of the snubber capacitor 655 is very small (e.g., in the order of 0.1 to 1 µF), the dissipated energy is typically a very small fraction of the total energy handled by the voltage converter as used in one embodiment of the CD-PAR.

Figure 7:
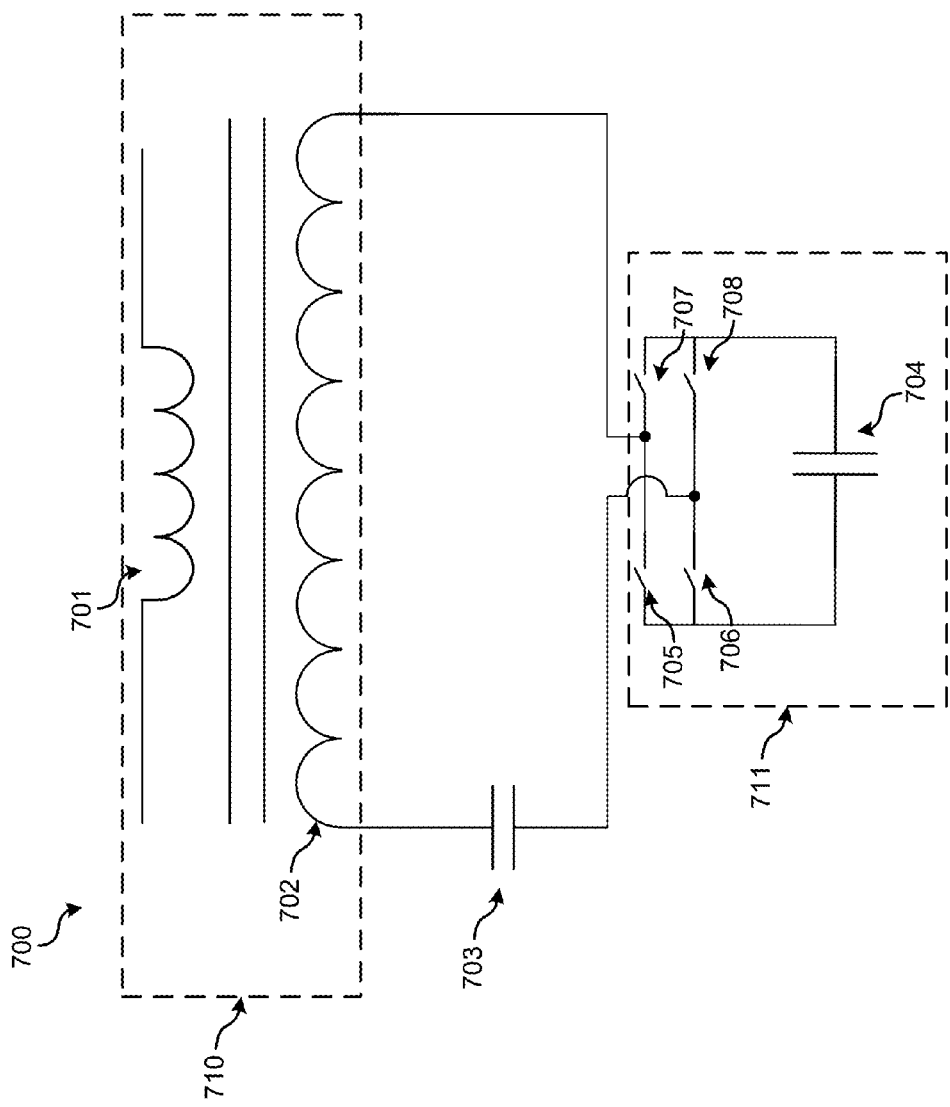
FIG. 7 is a schematic of a hybrid active filter in accordance with an embodiment of the invention.

FIG. 7 is a schematic of a hybrid active filter 700 in accordance with an embodiment of the invention described herein. The hybrid active filter is a well-tuned parallel LC resonating trap, which resonates at the frequency of the harmonic to be removed. The hybrid active filter comprises a parallel LC circuit comprising inductor 702 and capacitor 703 and a small rated inverter 711 comprising switches 705, 706, 707, and 708. The inverter injects a small voltage provided by capacitor 704, which negates the effects of non-idealities that may cause slight mismatch between the intended and actual resonating frequencies. In order to reduce the current rating of the inverter used in the hybrid active filter, a transformer 710 may be implemented to convert the voltage to a lower level. The magnetizing inductance of the transformer 710 provides the inductance to the LC trap. FIG. 7B illustrates the control scheme of the inverter 711.

Figure 8:
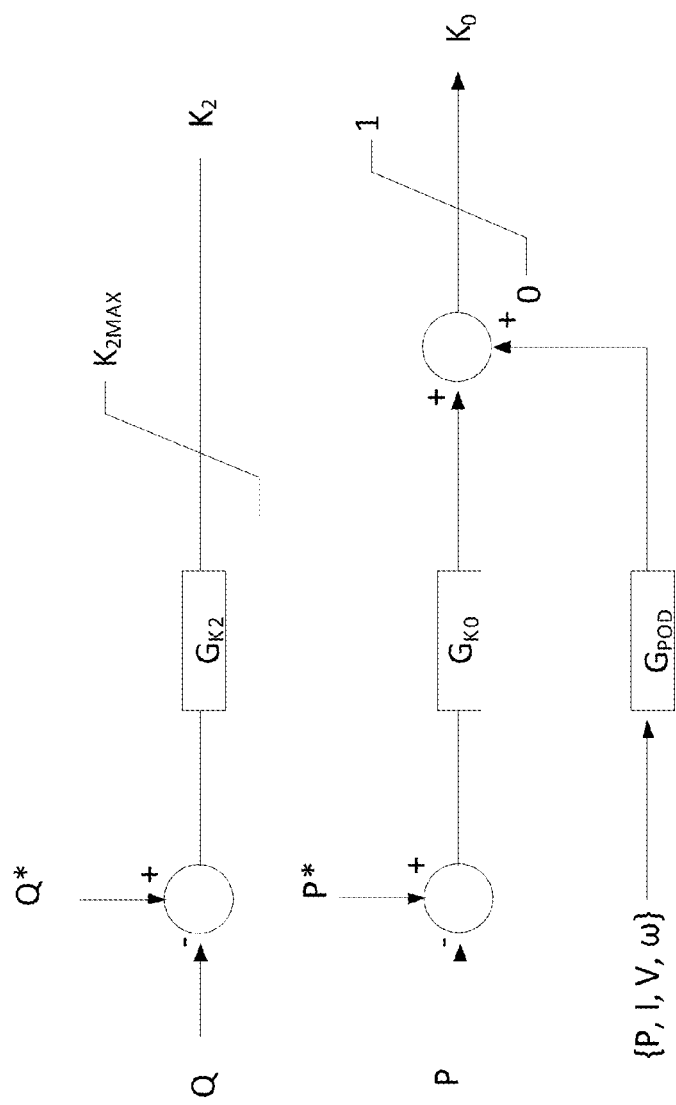
FIG. 8 illustrates a control block diagram of various embodiments of the present invention.

FIG. 8 illustrates a control block diagram of various embodiments of the present invention. In various embodiments, the duty value controlling each of the phase converters may be described as:

$$d_{abc}(t) = \begin{bmatrix} K_0 + K_2\sin(2\omega t + \phi_2) \\ K_0 + K_2\sin\left(2\omega t + \frac{2\pi}{3} + \phi_2\right) \\ K_0 + K_2\sin\left(2\omega t - \frac{2\pi}{3} + \phi_2\right) \end{bmatrix}$$

The primary control variables are $K_0$, $K_2$, and $\phi_2$. $K_0$ is used to affect real power while $K_2$ is used to control reactive power. For embodiments with buck configurations, $K_0$ may be varied between the range of [0,1]. For embodiments with boost configurations, $K_0$ may be varied between the range of [0,0.5]. $\phi_2$ may be used to provide a third degree of control. Accordingly, the two loops are saturated such that this range is never exceeded.

The compensators, $G_{K0}$ and $G_{K2}$, are used to regulate real and reactive power, respectively. The compensator $G_{POD}$ is used to provide power oscillation dampening, of which the feedback variable may be power, voltage, current, and/or line frequency.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the invention using other computing modules or architectures.

Referring now to FIG. 9, computing module 900 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for controlling active and reactive power flows between a first AC source and a second AC source, comprising:
   a transformer comprising a first set of windings and a second set of windings, each of the first set of windings coupled to a line-line voltage, and the center point of each of the second set of windings coupled to a line-neutral voltage; and
   a set of AC/AC converter coupled to the second set of windings, each of the set of AC/AC converters inserting a voltage to the corresponding line-neutral voltage.

2. The system of claim 1, wherein the transformer is a three-phase transformer and the first set of windings are connected in a delta configuration.

3. The system of claim 1, wherein the transformer is a single-phase transformer.

4. The system of claim 1, wherein the set of AC/AC converters comprises a buck converter.

5. The system of claim 3, wherein the buck converter comprises an output filter inductor.

6. The system of claim 1, wherein the set of AC/AC converters comprises a boost converter comprising a boost inductor.

7. The system of claim 5, wherein the boost inductor is the leakage inductance of the transformer.

8. The system of claim 1, wherein the set of AC/AC converters comprises a set of switches, further comprising a control module, wherein the control module generates a set of switching pulses to modulate the set of switches.

9. The system of claim 8, wherein the set of switching pulses comprise a constant component to generate a second voltage in quadrature with the line-neutral voltage, the second voltage being proportionate to the line-line voltage.

10. The system of claim 9, wherein the set of switching pulses comprise an even harmonic component to generate a third voltage in phase with the line-neutral voltage.

11. The system of claim 10, wherein the even harmonic is a second harmonic.

12. The system of claim 1, further comprising a hybrid active filter comprising an inductor and a capacitor resonating at a triplen harmonic, the hybrid active filter blocking the triplen harmonic.

13. The system of claim 11, further comprising a set of bypass switches, each of the set of bypass switches coupled across an AC/AC converter of the set of AC/AC converters.

14. The system of claim 1, further comprising an AC snubber.

15. The system of claim 1, wherein each of the AC/AC converters further comprises an output filter.

* * * * *